(12) United States Patent
Huang

(10) Patent No.: US 6,587,599 B1
(45) Date of Patent: Jul. 1, 2003

(54) METHOD AND APPARATUS FOR PRODUCING A COMPOSED OUTPUT RESEMBLING AN IMAGE

(75) Inventor: Shih-Chi Huang, San Jose, CA (US)

(73) Assignee: XMLCities, Inc., Milpitas, CA (US)

( * ) Notice: Subject to any disclaimer, the term of this patent is extended or adjusted under 35 U.S.C. 154(b) by 162 days.

(21) Appl. No.: 09/615,658

(22) Filed: Jul. 14, 2000

Related U.S. Application Data

(63) Continuation of application No. 09/028,973, filed on Feb. 24, 1998, now Pat. No. 6,175,663.

(51) Int. Cl.$^7$ .............................. G06K 9/36; G09G 5/00; H04N 9/74
(52) U.S. Cl. ................. 382/284; 345/629; 348/586
(58) Field of Search ................. 382/162, 187, 382/163, 164, 165, 284, 296, 298, 280; 345/103, 594, 597, 600, 619, 626, 530, 700, 629, 681; 348/239, 586, 588

(56) References Cited

U.S. PATENT DOCUMENTS

| | | | | |
|---|---|---|---|---|
| 5,220,312 A | * | 6/1993 | Lumelsky et al. | 340/721 |
| 5,420,971 A | * | 5/1995 | Westerink et al. | 395/133 |
| 5,627,959 A | * | 5/1997 | Brown et al. | 395/356 |
| 5,745,095 A | * | 4/1998 | Parchem et al. | 345/114 |
| 5,754,184 A | * | 5/1998 | Ring et al. | 345/431 |
| 5,914,748 A | * | 6/1999 | Parulski et al. | 348/239 |
| 5,937,104 A | * | 8/1999 | Henderson et al. | 382/279 |

* cited by examiner

*Primary Examiner*—Bhavesh M. Mehta
*Assistant Examiner*—Kanji Patel
(74) *Attorney, Agent, or Firm*—Joe Zheng

(57) ABSTRACT

The disclosed system has particular applications to image archives and reediting. Given an image of an article having graphic objects including texts and pictures, the disclosed system first distinguishes graphic objects from the background by segmenting the image so as to produce an object image comprising a foreground, wherein the foreground corresponds to the graphic objects in the image. With respect to the foreground, the disclosed system "repaints" those spaces previously occupied by the graphic objects, referred to as object spaces, with the background color in the image as such the background continuity is preserved when the graphic objects are rendered and subsequently superimposed onto the repainted background. To account for various backgrounds, the disclosed system uses a point-wise patching approach followed by a one-dimensional patching approach if the object spaces contain two different colors. In addition, a two-dimensional patching approach is implemented to account for printing effects such as half-toning and mosaic patterns.

28 Claims, 12 Drawing Sheets

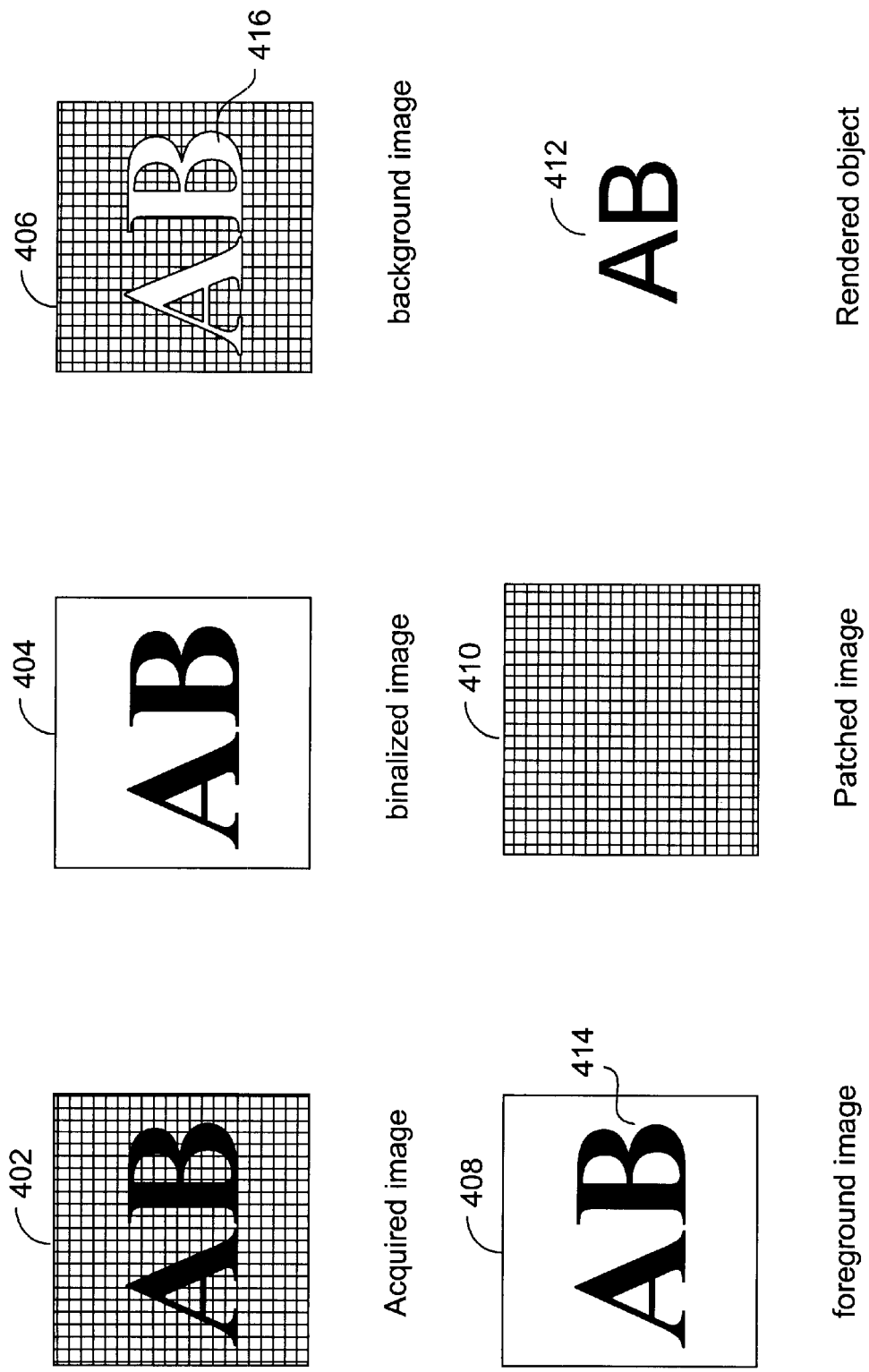
Fig. 4.a

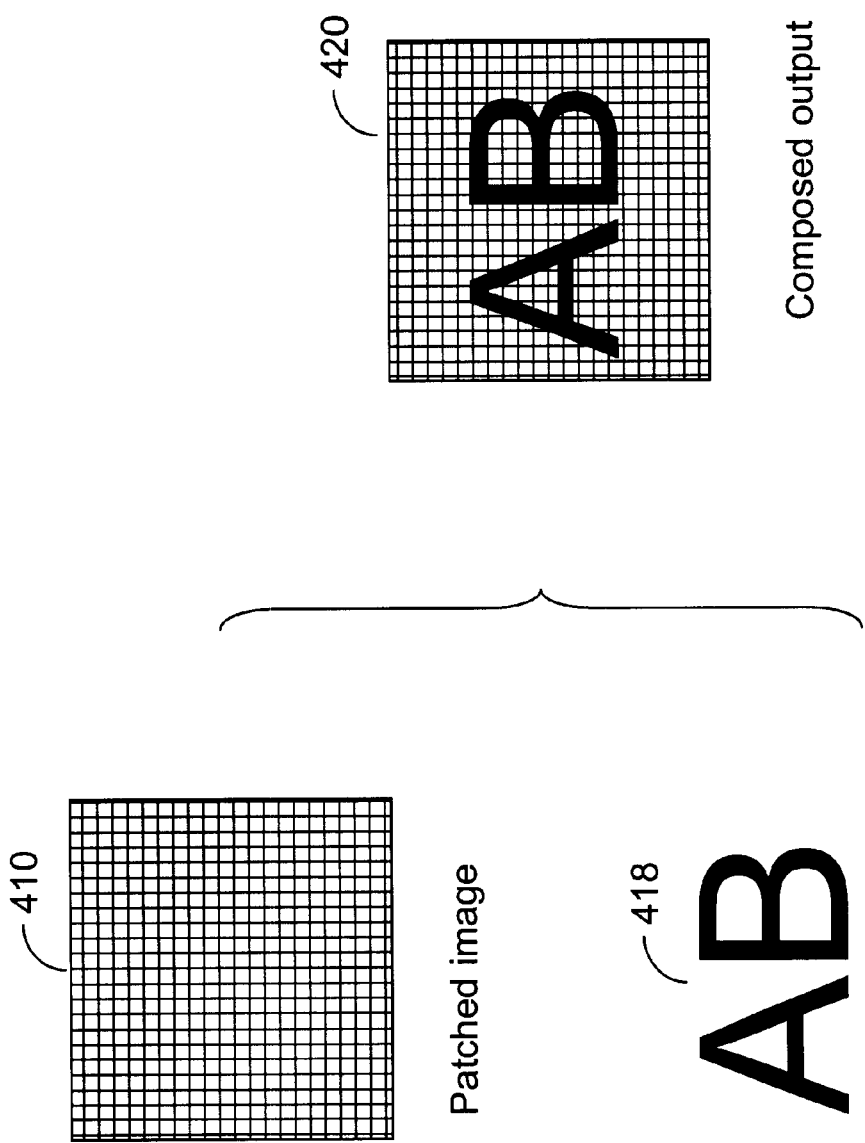

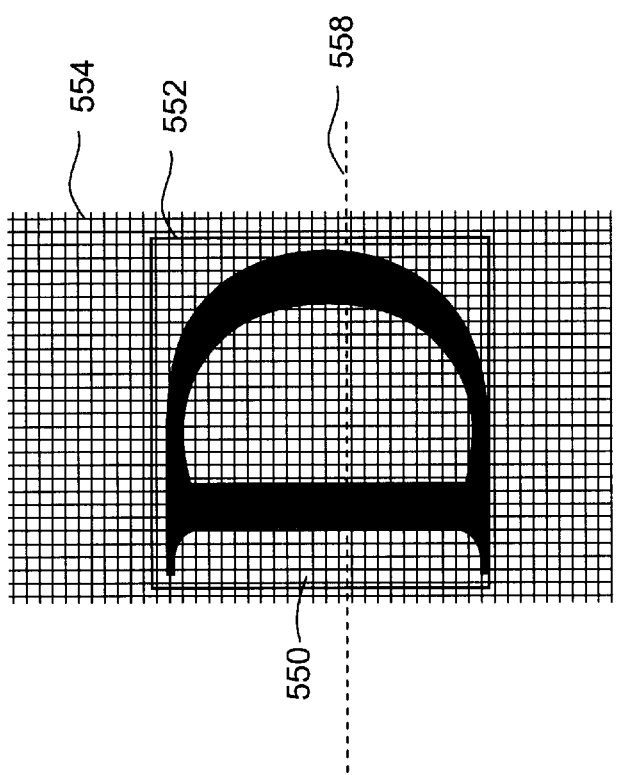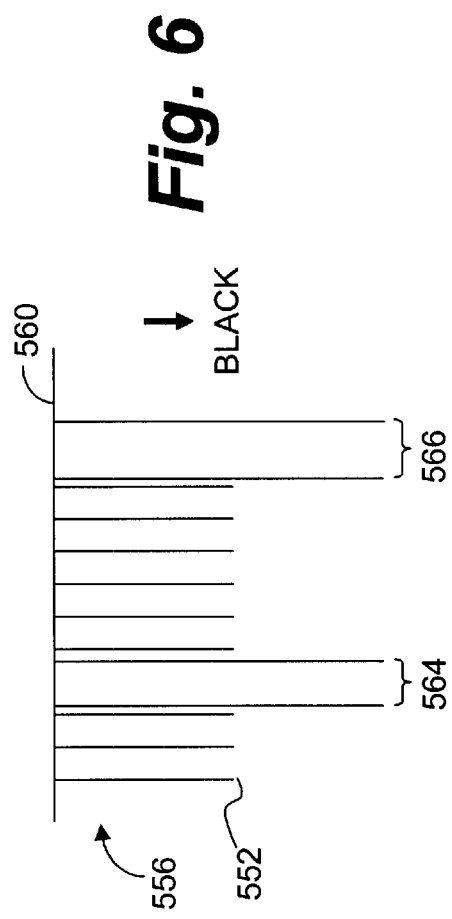

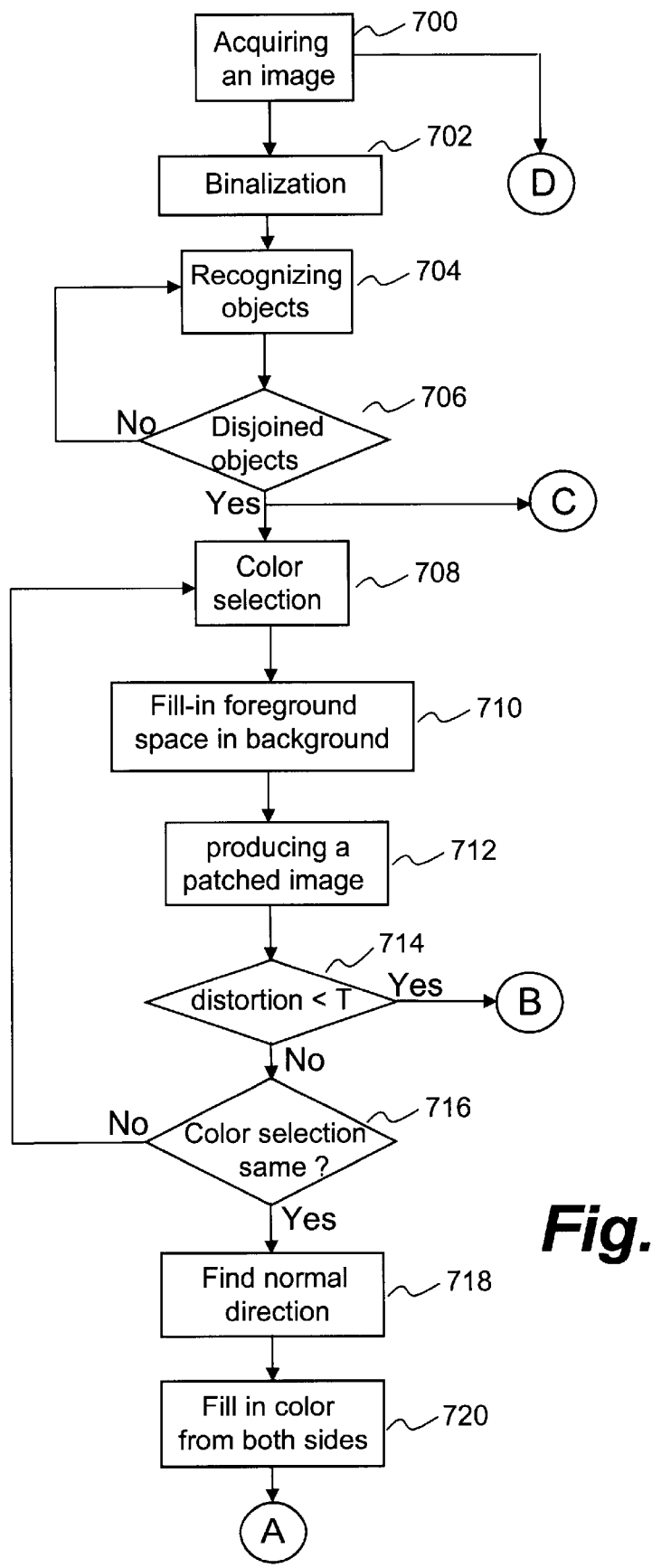
Fig. 7.a

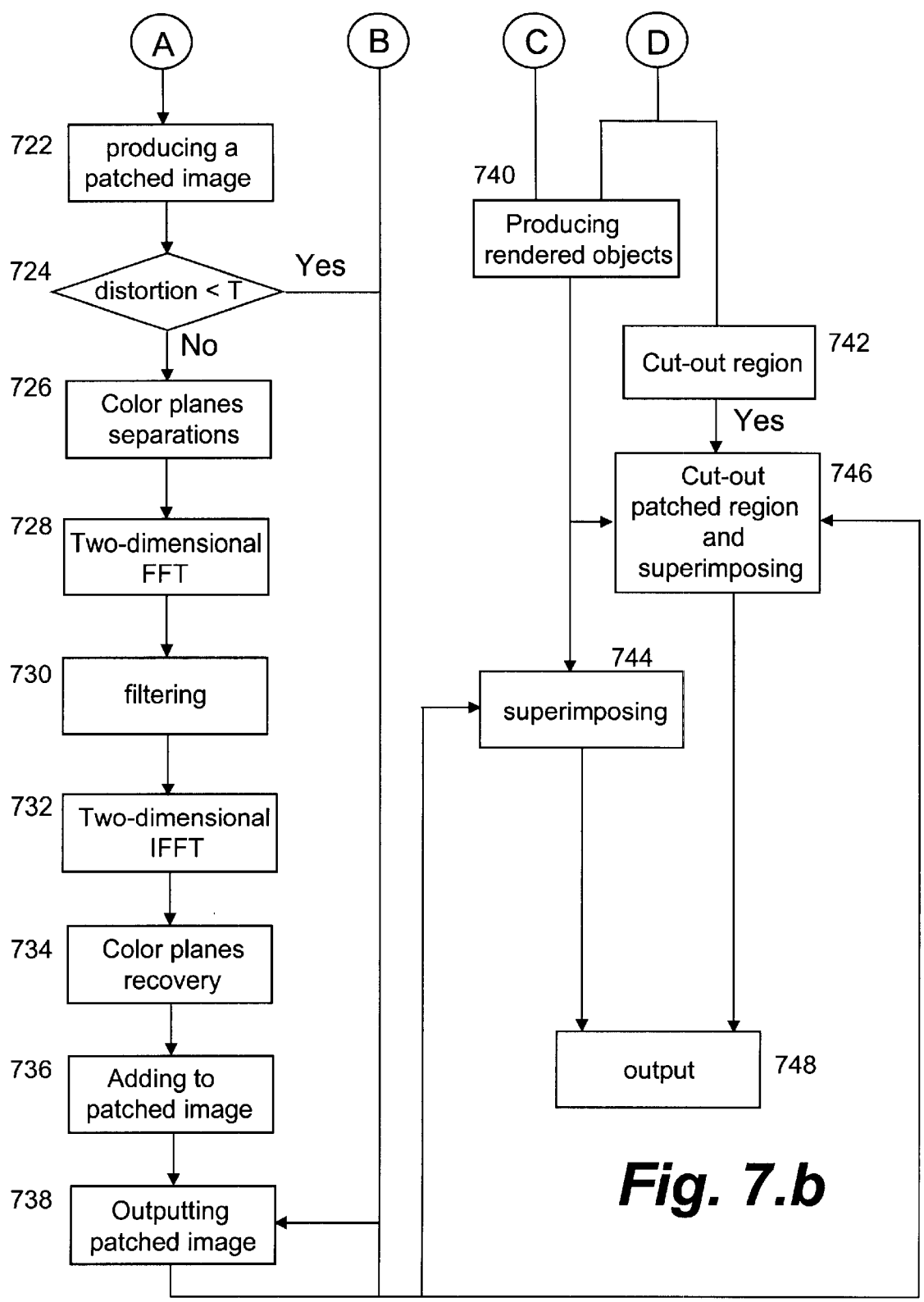
Fig. 7.b

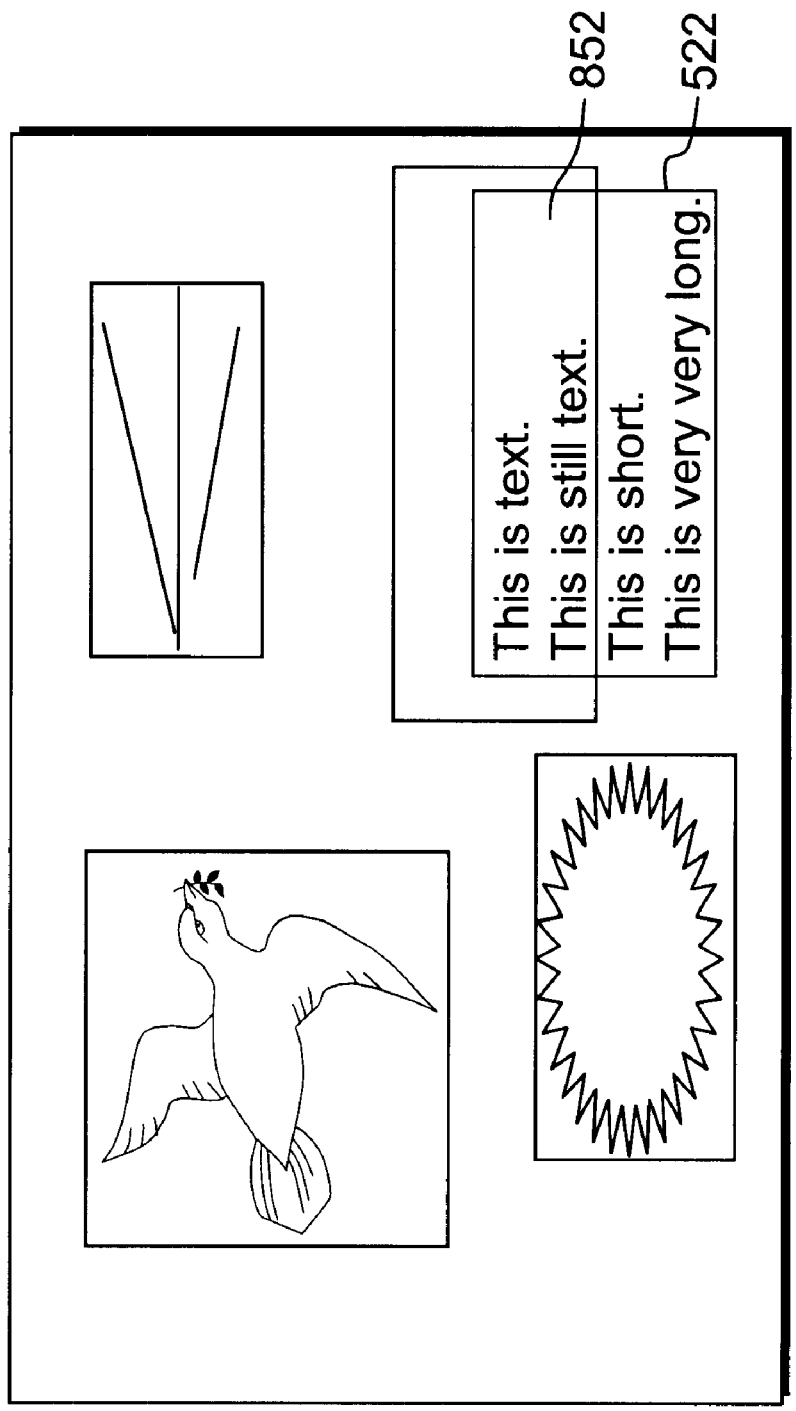

METHOD AND APPARATUS FOR PRODUCING A COMPOSED OUTPUT RESEMBLING AN IMAGE

CROSS-REFERENCE TO RELATED APPLICATION

This application is a continuation of U.S. patent application Ser. No. 09/028,973, filed Feb. 24, 1998 now U.S. Pat. No.:6,175,663 and entitled "Method and Apparatus for Preserving Background Continuity In Images ", filed on Sep. 24, 1998.

BACKGROUND OF THE INVENTION

1. Field of Invention

The present invention relates generally to image recognition and more particularly relates to methods and apparatuses for preserving background continuity in images when rendered objects in the images or other graphic objects are superimposed to the images.

2. Description of the Related Art

The Internet is a rapid growing communication network of interconnected computers and computer networks around the world. Together these millions of connected computers provide a new paradigm for information exchange via the Internet. Among the information being exchanged, images play an important role owing to its fidelity in preserving information across different platforms. Transmissions of image data, however, are always costly and slow because of the vast data involved and limited bandwidth in the Internet.

For images to be transmitted over a data network, a compressed version of the images must be obtained before the transmissions of the images take place. However, none of the current compression techniques are fully satisfactory because of either the poor resultant quality or low compression ratios. Efforts towards compression of such images are still going on. Nevertheless, there are a certain number of images that are graphics-based and can be transmitted efficiently without being compressed. Graphics-based images, unlike scenery images, can be analyzed to form a set of primitives from which the original graphics-based images can be exactly recovered. For example, an image of an article, instead of transmitting the image of the article, the text in the article is transmitted after the text is first recognized. Upon receiving the text, it is not difficult to reconstruct the image of the article.

It is well known that, besides text, graphic objects such as line, rectangle, circle and other geometric shapes can be presented by a small set of primitives with which the original shapes can be exactly recovered as well. Further there are applications that need to extract a set of primitives from images for archive. With derived primitives, images can be automatically searched based on the frequency of permutation of the primitives. One of most interested primitives from graphics-based images is to recognize texts. In the past ten years, several commercial optical character recognition (OCR) products, such as Caere's OmniPage and WordScan, Xerox's TextBridge, Expervision's TypeReader, and Adobe's Capture have been introduced and are capable of recognizing text in images of articles. However, there are no products that can fairly recover the images based on the recognized text. With today's printing technology, many texts are printed in a colorful background, to overlay the rendered text onto the colorful background while preserving continuity in the background remains a challenge problem. There is, therefore, a great need for a system that provides a generic solution to preserving background continuity when images are reconstructed with rendered objects.

SUMMARY OF THE INVENTION

The disclosed system has been made in consideration of the above described problems and has particular applications to image archives and reediting. Given an image of an article having graphic objects including texts and pictures, the disclosed system first distinguishes graphic objects from the background by segmenting the image so as to produce an object image. With respect to the object image, the disclosed system "repaints" those spaces previously occupied by the graphic objects, referred to as object spaces, with the background color as such the background continuity is preserved when the rendered objects are superimposed onto the repainted background.

According to one aspect of the invention, the disclosed system is a method for preserving the background continuity in an image when rendered objects are superimposed thereto. The method comprises:

acquiring the image comprising graphic objects;

producing an object image from the acquired image; wherein the object
  image comprises a background and a foreground, the foreground
  corresponding to the graphic objects in the acquired image; generating a patched image from the acquired image with respect to the
  foreground in the object image;

receiving rendered objects corresponding to the foreground; and reformatting the rendered object.

The method further comprises reformatting the rendered object, wherein the render objects may be generated from the acquired image, so that the composed output image containing the rendered objects resembles the acquired image.

According to another aspect of the invention, the disclosed system is an apparatus for preserving the background continuity in images. The apparatus comprises:

a working memory containing the image comprising
  graphic objects, each of the graphic objects occupying
  a respective object space;

a display screen;

an object engine generating an object image from the
  image, the object image containing a foreground and a
  background, the foreground corresponding to the
  graphic objects, respectively, and the object image
  displayed on the display screen; and a patch generator generating a patched image from the
  object image, the patched image displayed in the display screen; and an object rendering engine producing rendered objects.

The apparatus further comprises a composer superimposing rendered objects onto the object image, wherein the rendered objects are generated from the image with respect to the object image.

Accordingly, an important object of the present invention is to provide a generic solution to preserve background continuity when reconstructing images with rendered graphic objects.

Other objects, together with the forgoing are attained in the exercise of the invention in the following description and resulting in the embodiment illustrated in the accompanying drawings.

BRIEF DESCRIPTION OF THE DRAWINGS

These and other features, aspects and advantages of the disclosed system will become better understood with regard to the following description, appended claims, and accompanying drawings where:

FIGS. 4.a and 4.b illustrate exemplary outputs from each part in the block diagram of FIG. 3;

FIG. 6 shows a text object containing letter "D" surrounded by a rectangle as an object boundary in a grid background;

FIGS. 7.a–7.b show a data flowchart demonstrating processes and method for preserving background continuity in images in the disclosed system;

FIG. 10 illustrates a portion of a graphic object being processed through the disclosed system.

DETAILED DESCRIPTION OF THE INVENTION

Notation and nomenclature

In the following detailed description of the present invention, numerous specific details are set forth in order to provide a through understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

The detailed description of the present invention in the following are presented largely in terms of procedures, steps, logic blocks, processing, and other symbolic representations that resemble image data processing devices coupled to networks, printers, scanners and other computer systems. These process descriptions and representations are the means used by those experienced or skilled in the art to most effectively convey the substance of their work to others skilled in the art. The present invention is a method and apparatus for preserving continuity in images when graphic objects therein are rendered and superimposed thereto. The method along with the apparatus to be described in detail below is a self-consistent sequence of processes or steps leading to a desired result. These steps or processes are those requiring physical manipulations of physical quantities. Usually, though not necessarily, these quantities may take the form of electrical signals capable of being stored, transferred, combined, compared, displayed and otherwise manipulated in a computer system or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "computing" or "verifying" or "displaying" or the like, refer to the actions and processes of a computing device that manipulates and transforms data represented as physical quantities within the computing device's registers and memories into other data similarly represented as physical quantities within the computing device or other electronic devices.

The Preferred Embodiment

Figure 1:
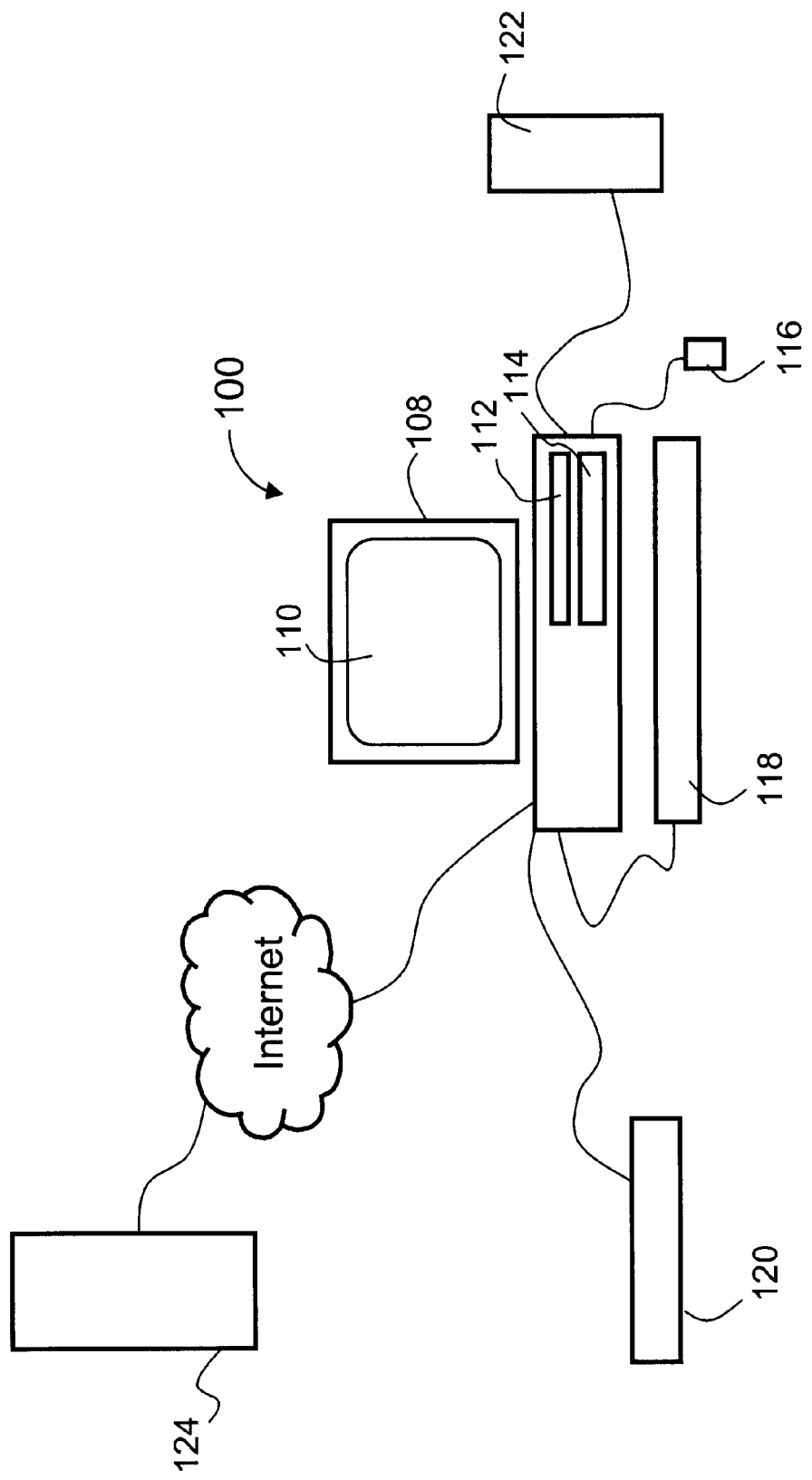
FIG. 1 is a schematic representation of a configuration system in which the present invention may be practiced.

Referring now to the drawings, in which like numerals refer to like parts throughout the several views. FIG. 1 shows a schematic representation of a configuration system in which the present invention may be practiced. Shown in FIG. 1 is a computing device 100 which may be an IBM PC or PC-compatible computer operating under a window operating system, for example, Microsoft Window 95. Computer device 100 is provided with a display monitor 108 having a display screen 110 on which computing device 100 displays images to users. Computing device 100 is further provided with a floppy disk drive 112 with which removable floppy disk media may be read or written, fixed disk drive 114 for storing data file and application program files, a keyboard 118 for permitting input of text data and commands and to manipulate objects and images displayed on display screen 110, and a pointing device 116 such as a mouse or the like which is also provided to permit execution of commands to manipulate objects and images on display screen 110. A conventional scanner 120 is provided for scanning original documents such as color images so as to input color image data to computing device 100. A conventional color printer 122, such as a color ink jet printer from Hewlett Packard, is provided for outputting color images. Also provided are connections to a network server 124 via the Internet for sending and receiving color images data as well as other files such as files which include program instruction sequences by which computing device 100 is operated.

It is generally understood that the computing device 100 includes a microprocessor and a working memory having sufficient capacity to store an image and other applications. Along with other applications and the window operating system, compiled and linked processes of the disclosed system in the present invention are loaded, preferably, in the working memory. In accordance with instructions from a user, and under control of the window operating system, the compiled and linked processes of the disclosed system are selectively activated to process and to manipulate the image data. Also in accordance with the user's instructions, and based on the stored applications and the like, commands are issued to scan in images on scanner 120, to display image on monitor 110 and to print images appearing on monitor 110, and those images are then printed on printer 122 as described more fully hereinbelow.

Figure 2:
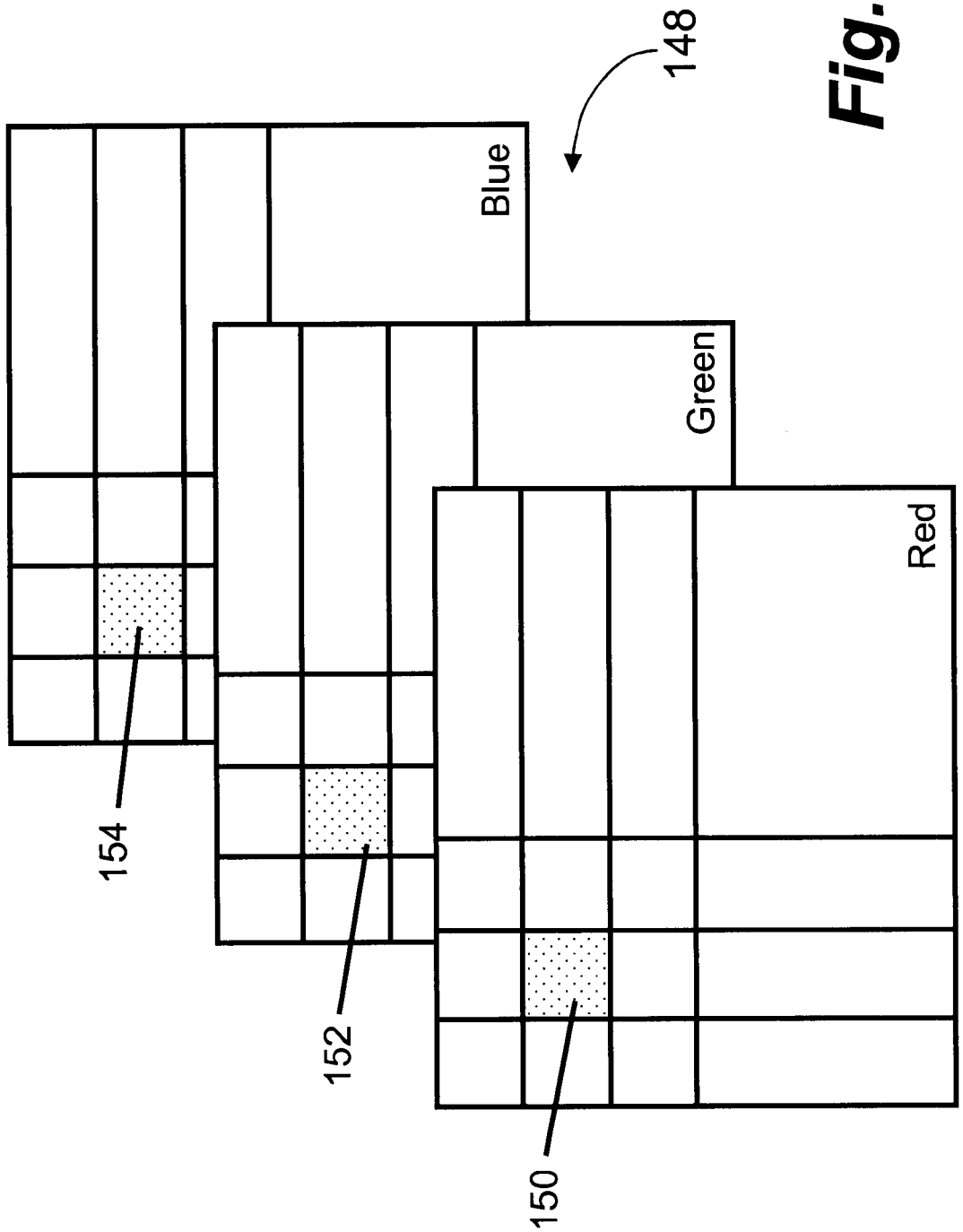
FIG. 2 depicts a representational view of RGB color components that form a bit map color image as an exemplary format used in the present invention.

FIG. 2 depicts a representational view of a color image in bitmap image format that is primarily used in the present invention. As seen in FIG. 2, a bit map image data 148 comprises pixels in three different color planes, typically a red color plane, a green color plane and a blue color plane. Therefore, each pixel of color image 148 has corresponding pixel data 150, 152 and 154 in each color plane, therefore a color pixel, or vector pixel hereinafter, may be represented by a vector, for example:

vector pixel=[255, 0, 0]

where the vector pixel has respective intensity elements or scalar pixels values: red (R)=255, green (G)=0; and blue (B)=0. The respective scalar pixels in the color image 148 are generally in an eight-bit scale and stored in a memory such as on disk 114 or in the working memory. Thus, the color of each vector pixel in the color image is represented by 24 bits of data, and is commonly referred to as 24-bit or 16-million color data.

Figure 3:
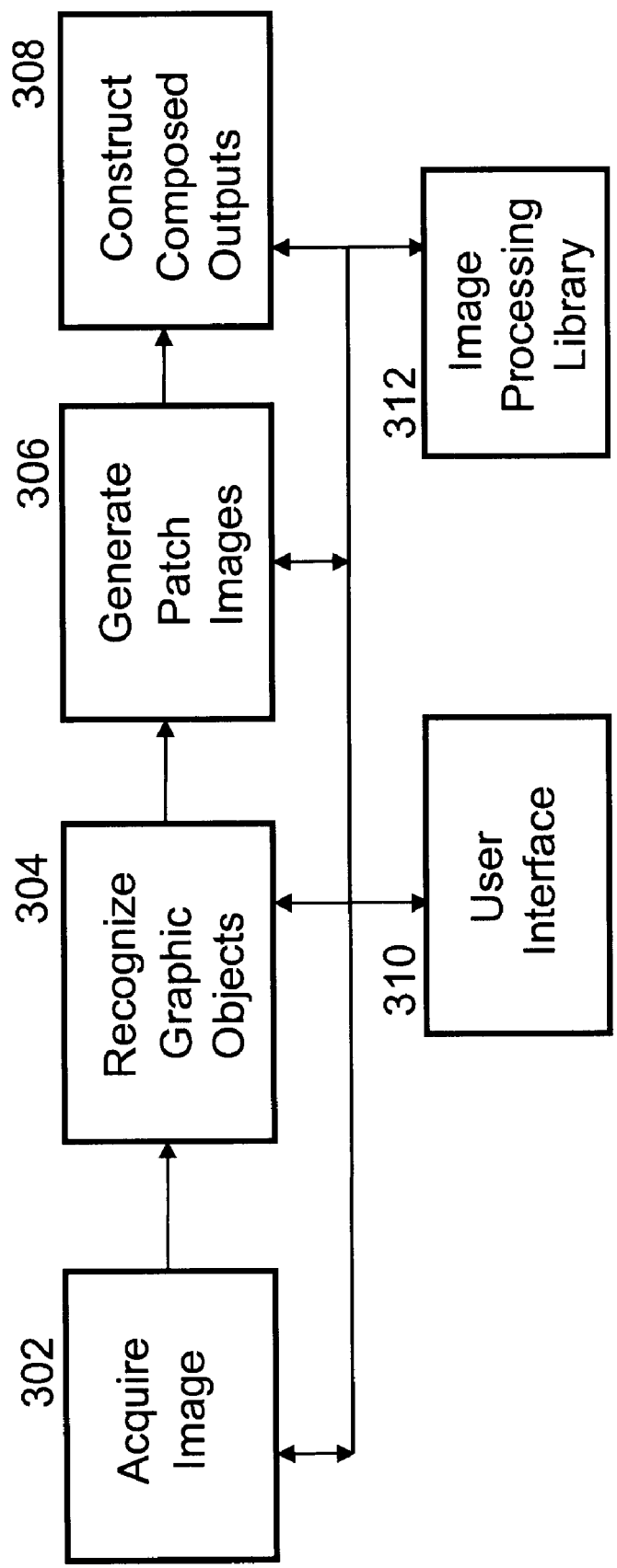
FIG. 3 shows a block diagram of the disclosed system.

FIG. 3 shows a detailed block diagram of the disclosed system and should be understood in conjunction with FIG. 1 and FIGS. 4.a–b. A color image is acquired in block 302 into computing device 100 in which the linked and compiled processes of the disclosed system are loaded. Normally scanner 120 is used in block 302 to optically scan a document so as to generate an electronic version, namely an image, thereof. The image may be transported into computing device 100 through a TWAIN interface. TWAIN, having no specific meaning, is an industry standard and an interface that allows one to scan an image directly into an application loaded in a computing device to manipulate the image. It should be noted that scanner 120 or TWAIN is not part of the present invention and used only herein to facilitate the description of the present invention. It is well known that a digital camera may acquire a color image as well and the color image may be transported into computing device 100 through a serial port thereof. In reality there are many other ways to acquire images and transported into computing device 100; for example, a color image may be downloaded from web server 124, or copied from disk media 112 or 114.

The acquired image is generally cached or stored in the working memory of computing device 100 for random access by the linked and compiled processes of the disclosed system to manipulate the pixel data therein. An example of the acquired image 402 is illustrated in FIG. 4.a which shows two letters 414 printed in a grid background. Block 304 is to segment the image into various graphic objects. When the acquired image is a color image, a process in block 304 is, preferably, to convert the color image into a gray image, namely to convert vector pixels to scalar pixels, respectively. Also in block 304, a binarization process takes place to convert the gray image into a binary image, meaning only black and white therein. A binarized image 404 resulting from acquired image 402 is shown in FIG. 4.a. Binarized image 404 virtually comprises a background image 406 and a foreground image 408. Background image 406, having a hollow 416, represents the majority area in acquired image 402 and foreground image 408 represents printed letters 414 that occupies hollow 416 that is also referred to as an object space. It is understood to those skilled in the art that background image 406 and foreground image 408 are merely another representation of binarized image 404, with which corresponding pixels in acquired image 402 can be located and manipulated accordingly. A software development kit (SDK) is used in block 304 to perform the task of segmenting the image into graphic objects. The SDK is provided by ExperVision, Inc. located at 48065 Fremont Blvd. Fremont, Calif. 94538. To assist a user to verify the segmentation result, the segmented objects are preferably and respectively boarded by a rectangular and displayed on display screen 110.

Block 306 generates a patched image 410 from acquired image 402 with respect to binarized image 404. Patched image 410 is a recovered background image without printed object 414. Generally, the approximated position of printed object 414 must be obtained before such "repaint" process can proceed. The approximated position can be inferred from foreground image 408 that isolates object 414 from the background. Block 306 will be described in more detail below. Block 312 is a standard image processing library. Based on acquired image 402 and binarized image 404, block 312 produces a rendered object. To be more specific, acquired image 402 includes printed letters 414 that are identified as an object in binarized image 404. The object is processed and subsequently rendered as a pair of letters "AB" by the standard image processing library. The output from block 312 is therefore a rendered object "AB". According to one embodiment of the present invention, a commercially available image processing library is used in block 312, the library is called ImageGear 32PD from AccuSoft Corporation located at 2 Westborough Business Park, Suite 3013, Westborough, Mass. 01581. FIG. 4.b shows an output 420 from block 308 that comprises a process of superimposing the rendered object from block 312 onto the patched image from block 306. It can be appreciated by now that the constructed image from block 308 shall retain the fidelity of the acquired image if the objects are correctly rendered and the patched image is a true recovery of the background. With patched image 410 and rendered object 412, output 420 can have various fonts, size or colors of rendered object 412 that can be even displaced without displaying background discontinuity caused by printed letters 414. Block 310 is a graphic user interface (GUI) to allow a user of the disclosed system to interactively monitor the processes in the disclosed system. For example, an acquired image may need operator-intervened setting, for example, a threshold, in order to produce a satisfactory binarized image. The user, through GUI, can manually adjust or separate two overlapped objects if there are two shapes that are too close in the acquired image to be automatically separated. A detailed example is shown below.

Figure 5:
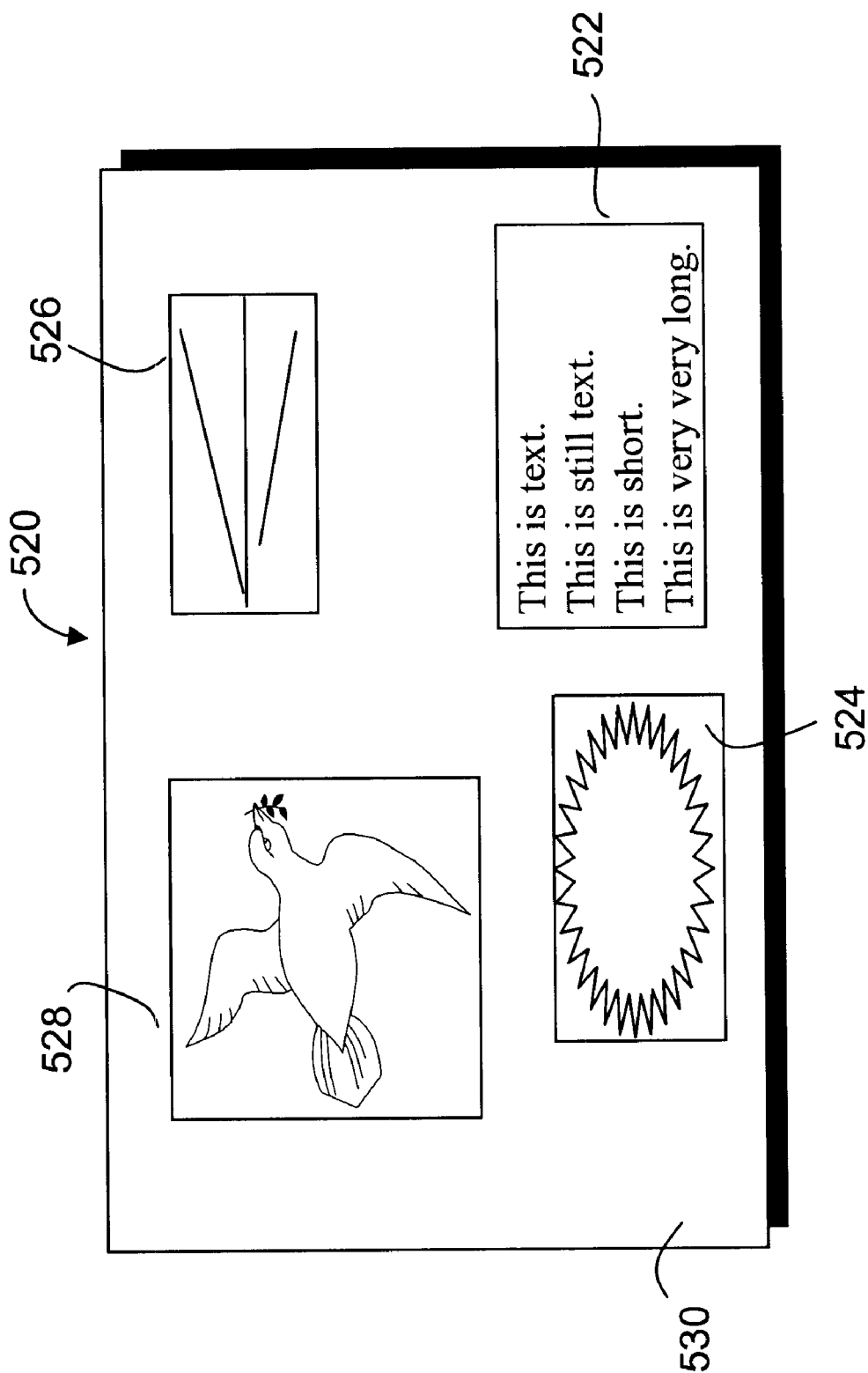
FIG. 5 shows an acquired image overlaid with object boundaries.

FIG. 5 shows an example of an acquired image including text and graphics. After acquired image is processed through block 304, an object image 520 is generated, and comprises a text object 522 and other graphic objects 524, 526 and 528. As shown in the figure, graphic object 526 includes two lines, each line being enclosed by its own rectangles and the two rectangles can be overlapped. As described before, block 310 is a user interface that allows a user to do a number of visual editing besides activating commands for the disclosed system to perform certain tasks. Some objects in an image can be difficult to be separated automatically, which results in object boundaries, namely rectangles, overlapped. In other instances, a shape object may be mixed with a text object. Through block 310, the user may manually separate a mixed object into several disjoined objects by visually examining each object displayed on display screen 110 or combine objects if they are other than objects to be rendered. Since text object 522 is of interest in one embodiment, the two lines resulting in two separate objects are therefore combined into one object 526. That means only object 522 is to be rendered in block 312. When the object image is displayed, block 310 further allows a user to choose which objects are to be rendered depending on what functionality that the image processing library is loaded in block 312. As long as objects of interest are distinctly separated from others, the result from block 310 is considered satisfactory.

FIG. 6 shows a text object 550 containing letter "D" enclosed by a rectangle 552 in a background 554. In this example, background 554 is a grid. Although there is no special graphic requirement for being a background, the graphics in the background generally alters gradually. In other words, no blobs of sudden-changed colors are used for a background, otherwise block 304 would detect the blobs and confuse them as graphic objects. For simplicity, a grid pattern is used in this particular and the contrast thereof is so low that block 304 would not detect the actual grid. Therefore only block 552 indicating that a text object is detected. A corresponding horizontal pixel signal 556 shows intensity strength of pixels along a crossing indication 558. Baseline 560 represents the space color in the grid and short vertical lines 562 shows the line color in the grid lines. As indicated, the line color is darker than the space color in the grid. Letter "D" is a lot darker than the line color so that letter "D" can be visually distinguished from background 554. Accordingly, there are two groups of pixels 564 and 566 representing the intersection portion by crossing indication 558. To preserve the continuity of background 554, block 302 produces a patched image reflecting that those pixels representing background 554, now overwritten by two groups of pixels 564 and 566 due to letter "D", are repainted by background 554. When object "D" is rendered, it can be superimposed with different fonts, colors and sizes onto the patched image without displaying any background discontinuity caused by original object "D" 550.

Referring now to FIGS. 7.a and 7.b, there is shown a data flowchart illustrating the processes disclosed in the present system. The flowchart should be understood in conjunction with FIGS. 1, 3 and 6. At 700, an image is produced from an imaging device 120, such as a flatbed scanner. The image is, preferably, a color image represented by a plurality of vector pixels in terms of RGB bitmap format. The vector pixels are loaded in the working memory of computing device 100 for subsequent manipulation by the disclosed system. At 702, the vector pixels are preferably transformed to scalar pixels. In other words, a gray image is processed at 702 to produce a binarized image. There are a few existing methods to convert a color image to a gray image, a commonly used method is to use the standard conversion in NTSC, i.e.

$$Y = 0.3 \times R + 0.59 \times G + 0.11 \times B;$$

where Y is the converted scalar pixel from the elements R, G, B of a vector pixel in a color image. The obtained scalar image is typically in 8 bit format, namely the value of Y is in a range of 0 to 255. The binarization process can be performed by using a fixed threshold, for example, 128. Any scalar pixels having values equal to or over 128 are converted to 1 or 255 and any scalar pixels having values below 128 are converted to 0. Typically, 1-valued pixels are the background and 0-valued pixels are the foreground or the objects as shown in FIG. 6. This is, however, not always true. Sometimes a document having dark color background while texts and other figures therein are in light color. The resultant binarized image is therefore just the opposite. In following description, it is assumed that 1-valued pixels are the background. It is understood to those skilled in the art that the description is equally applied to the case in which 0-valued pixels are the background.

At 704, an object image is generated from the binarized image. A well-known method in image processing area called split-and merger technique can be used to separate objects from the background given a scalar image and a binarized version thereof. As described before, a commercial library is used according to one embodiment. To ensure that the object image has distinct objects, the object image is preferably displayed at 706 for a user to visually inspect the objects in the object image. If there are ambiguities between any objects, an interactive means for separating the objects is provided by GUI in block 310 along with a mouse 116. It is clear by now that the rectangles surrounding identified objects are displayed for a user to visually inspect the object image and in reality they are consecutively numbered. The user may interactively resize the rectangles to properly enclose the identified objects or separate any ambiguous rectangles to distinguish text objects from others and further perform other visual tasks based on the contents in the identified objects. When finally satisfied with the object image after repeated processes at 704 and 706, the user may take a note of the number of the rectangles properly surrounding the identified objects and determine which objects identified by the numbered rectangles should be further processed in the image processing library in block 312. As described before, a satisfactory object image should have text objects clearly disjoined from other non-text objects when text objects are the only objects of interest to be rendered in block 312 according to one embodiment of the disclosed system.

With the original acquired image displayed and supported by the object image, the user may manually choose a color from the background to fill in the area occupied by the text objects at 708. It can be appreciated that the color may be automatically chosen by the process in block 306 with respect to the object image. For example, the color of the background is represented by a vector pixel [25, 255, 0] and the colors of the text objects are other than the color of the background. With respect to the objects of interest in the object image, the chosen color repaints the object areas, cross-referenced by the objects of interest in the object image, in the original acquired image at 710. In other words, wherever there are 1-valued pixels that are in the object-image, the corresponding vector pixels in the original acquired image are replaced by the chosen vector pixel C=[25, 255, 0]. This may be viewed as patching the foreground in the object image.

To ensure that the patched or repainted areas match to the background, a verification process at 714 compares the patched image with the original acquired image at 700. There are many methods that can be used to measure the color difference between the chosen color and the background. According to one embodiment, the verification process uses summed Euclidean distance measurement between the chosen color and vectors pixels along the patched areas, or expressed as follows:

$$\text{Color\_difference} = \frac{1}{N} \sum_{i=1}^{N} \sqrt{(C - C_i)2}$$

where N is the total number of vector pixels $C_i$ used to compare with the chosen color C. The result Color_difference is then compared to a threshold, for example 200. If Color_difference is less than the threshold, the patched image is output at 738. If Color_difference is greater than the threshold, which indicates that the chosen color C is not a good one, a new color selection is made at 708 and the whole process is repeated till Color_difference less than the threshold.

Figure 8:
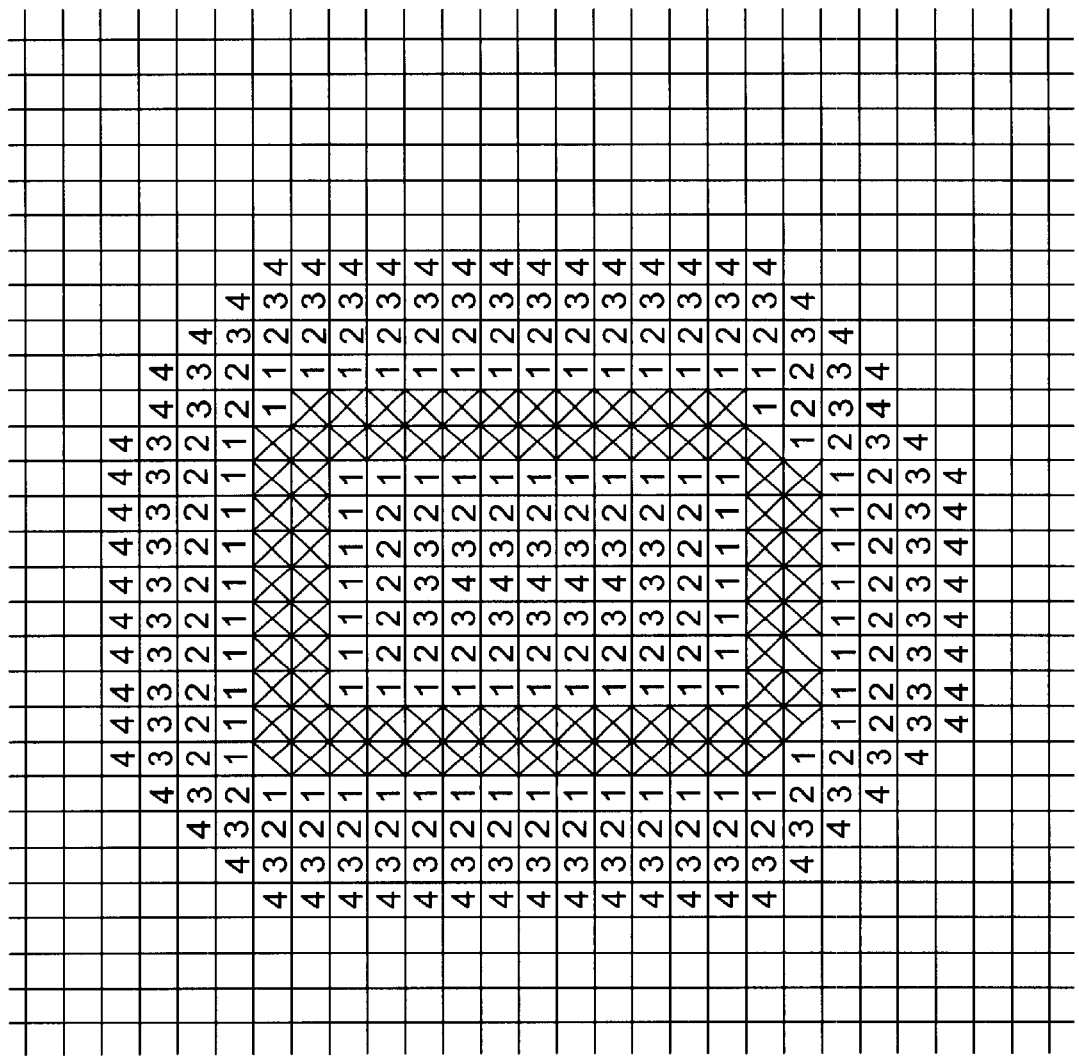
FIG. 8 demonstrates adaptive color selection using erosion pixels around an object area.

Using a chosen color to repaint the object spaces generally results in acceptable patched image when the background is in homogenous color. To account for the background that has non-homogenous colors, an adaptive approach is used according to one embodiment. Instead of using a chosen color to fill in the foreground in the object image, a color is adaptively chosen according to the vector pixels surrounding the object spaces in the object image. As the object areas are being painted, a new color is constantly reselected to minimize the color difference function defined by a weighted norm measure of erosion pixels. Referring to FIG. 8, there is shown an object area being painted according to the erosion pixels. The Color_difference is, for example, defined by four erosions, as expressed as follows:

$$\text{Color\_difference} = \frac{1}{N} \sum_{j=1}^{4} \sum_{i=1}^{N_j} w_j \sqrt{(C - C_i)2}$$

$$N = \sum_{j=1}^{4} w_j N_j$$

where Color_difference is the weighted sum of Euclidean difference between the color vector C and each vector pixel $C_i$ of $N_1$ in first erosion 802, Euclidean difference between the color vector C and each vector pixel $C_i$, of $N_2$ in second erosion 804, Euclidean difference between the color vector C and each vector pixel $C_i$ of $N_3$ in third erosion 806 and Euclidean difference between the color vector C and each vector pixel $C_i$ of $N_4$ in forth erosion 808. It should be noted that the Color_difference is normalized by the total number N vector pixels in the background surrounding the patched color space.

The point-wise method patching does allow a repetitive search for colors that match the background with minimum visual distortion. Sometimes, such colors, however, may not be obtained because of particular colors or patterns in the background. To prevent the search from going on indefinitely, a newly selected color is compared to the previously chosen color. If the two colors are found repetitively close enough at 716, it is indicated that the search has been exhaustive and no colors can be found to further minimize the color difference. A more aggressive approach, called one-dimensional patching method, is followed. This approach is called upon typically when there are two different colors across an object area.

Figure 9:
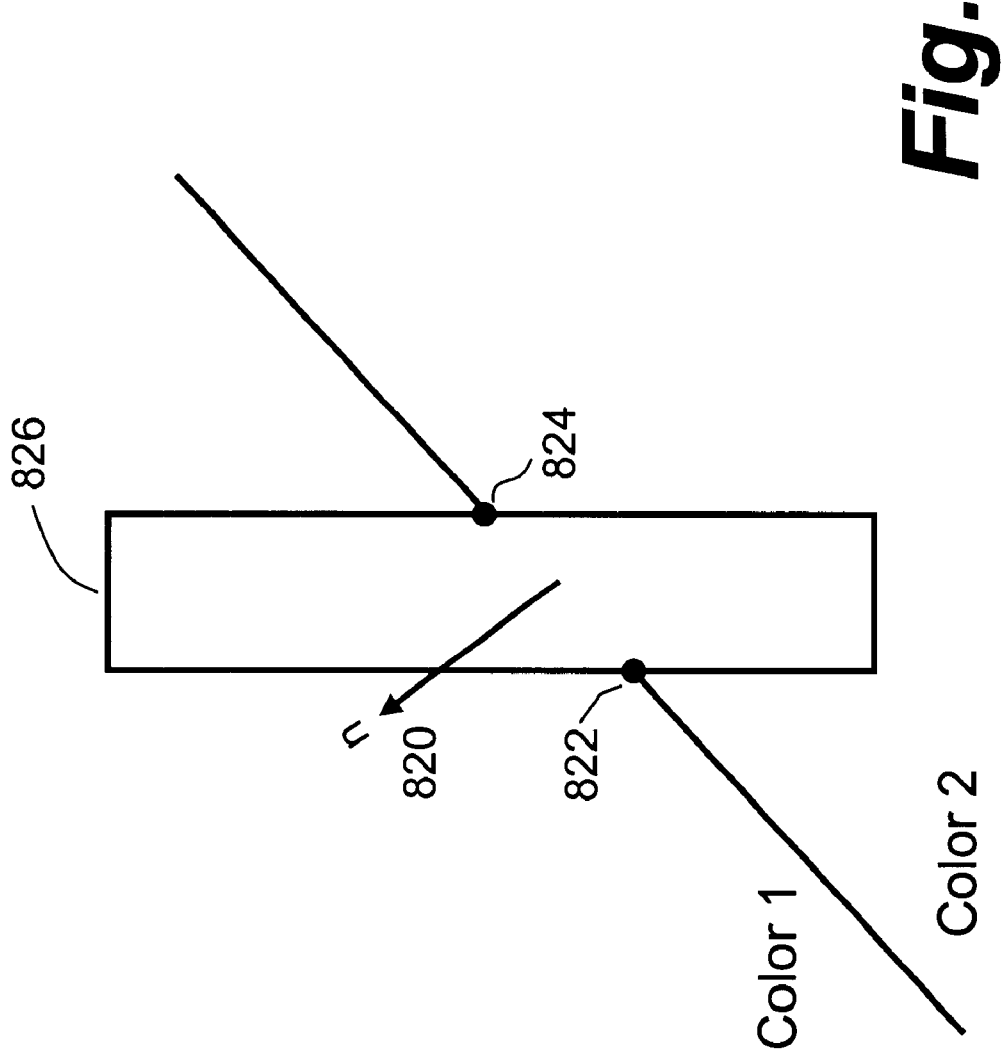
FIG. 9 shows one-dimensional patching approach.

At 718, a normal direction 820 in FIG. 9 is first determined from the crossing points, or coordinates 822 and 824, between two color regions. FIG. 9 illustrates an example of showing an object space 826 crossing the two color regions, color 1 and color 2 in a background. With a pair of coordinates, it is known to those skilled in the art to determine normal direction 820 of the line connecting coordinates 822 and 824. When normal direction 820 is determined, either the above one chosen color approach or the point-wise patching approach can be used to repaint the object area 826. As described above, the one chosen color approach is always applied when the different color regions, color 1 and color 2, each is a homogenous color. When the two different color regions, color 1 and color 2, are not homogenous colors, the adaptive color search approach is applied, namely a color is chosen to fill in the object area by minimizing the color difference between the chosen color and surrounding erosion pixels.

Similar to the point-wise patching approach, the 1-D patching approach generates a patched image that is then compared to the original acquired image. If the comparison is less than the threshold, the patched image is output at 738, However, many printed documents demonstrate halftone or mosaic patterns and these patterns may often cause Color_difference in the 1-D patching approach greater than the threshold. To preserve the background continuity, a two-dimensional patching approach is followed starting at 726.

At 726 the patched image generated from the 1-D patching approach is first separated to a luminance component and two chrominance components. There exist many color spaces that separate the luminance component from the chrominance components in a color image, for example, YIQ in NTSC transmission system, L*U*V* or L*a*b* uniform color space, wherein Y or L* is the luminance component and I and Q, U* and V* or a* and b* are the two corresponding chrominance components. As the patched image from the 1-D patching approach is displayed, the GUI, preferably, provides means for selecting only a small portion that covers the crossing points and is transformed to the luminance component and two chrominance components. At 728, a two-dimensional Fourier Transform is applied to the converted luminance and chrominance components, respectively. It is generally known that a faster computing approach called Fast Fourier Transform (FFT) can be applied when the size of the components is in power of 2, such as 2, 4, 16, 32, 64 and etc. Thus at 728, zeros are padded to the components to the nearest number in power of 2 if the sizes thereof are not in power of 2 before FFT is applied thereto. After the luminance and chrominance components are FFT-transformed, a spectral-version of the luminance and chrominance components are generated. A filtering process is respectively applied to the luminance and chrominance components at 730 to extract those frequencies whose magnitudes are significantly greater than others. In other words, the filtered spectral luminance and chrominance components have only those frequencies having significant magnitudes with the rest being set to zero. An inverse FFT is then respectively applied to the filtered spectral luminance and chrominance components, which produces a filtered luminance and two chrominance components. It is generally understood to those skilled in the art that only the filtered luminance component is needed if the color separation at 726 generates a truly uncorrelated luminance component. In other words, if the luminance component is truly uncorrelated with the corresponding chrominance components, then only the luminance component needs to go through the FFT, filtering and inverse FFT process. One method to generate such uncorrelated luminance and chrominance components is to use Karhunen-Loeve (KL) transform. At 734, a color version of the filtered luminance and chrominance component is respectively recovered. The color version is then added to the patched image generated from the 1-D patching approach, often to reduce Color_difference or add those artifacts caused by the background to minimize any background discontinuity from the perspective of users. The modified patched image is then output at 738.

At 740, the objects identified at 706 are rendered in block 312. It should be noted that only those objects of interest are actually to be rendered in block 312. According to one embodiment, only text objects are inputs to block 312 at 740 from which an ASCII version of the text objects are produced. The rendered objects are then superimposed onto the patched image from 738 and the constructed image is subsequently output at 748. It can be understood by those skilled in the art that the render objects may be graphically manipulated before superimposed onto the patched image, for example, the ASCII version of the text objects may be enlarged and in one or more different colors and fonts.

There are some applications that require only a portion of the acquired image to be processed through the disclosed system. FIG. 10 shows an example in which a portion 852 of object 522 is to be rendered. At 742, the desired portion is defined, as such, the patched image from 738 has to be "cutout" or windowed according to the desired portion. Similarly, the rendered object, must be windowed according to the desired portion, namely the top portion of the object 522. At 746, the windowed portion from the patched image and the rendered object are superimposed to the original acquired image, the constructed result is output at 748.

The present invention has been described in sufficient detail with a certain degree of particularity. It is understood to those skilled in the art that the present disclosure of embodiments has been made by way of example only and that numerous changes in the arrangement and combination of parts as well as steps may be resorted without departing from the spirit and scope of the invention as claimed. Accordingly, the scope of the present invention is defined by the appended claims rather than the forgoing description of one embodiment.

What is claimed is:

1. A method for producing a composed output resembling an image, said method comprising:
    receiving said image comprising graphic objects;
    producing an object image from said image, wherein said object image comprises a background and a foreground, said foreground corresponding to said graphic objects in said image, said background corresponding to an area unoccupied by said graphic objects, and both of said foreground and background are extracted from said image;
    generating a patched image from said object image by filling in spaces occupied by said foreground with colors of said background;
    receiving rendered objects corresponding to said foreground;
    reformatting said rendered objects in a way preferable to a user; and
    superimposing said rendered objects onto said patched image to produce the composed output.

2. The method as recited in claim 1, wherein said superimposing said rendered objects onto said patched image comprises placing said rendered objects onto the patched image with respect to original positions of said foreground to produce the composed output image with said rendered objects replacing said graphic objects.

3. The method as recited in claim 2, wherein said rendered objects are generated from said graphic objects in said acquired image with respect to said foreground in said object image so that said composed output image containing said rendered objects resembling said graphic objects.

4. The method as recited in claim 3,
    wherein said acquired image comprises vector pixels; and
    wherein said acquiring said image comprises loading said acquired image into a working memory for subsequent manipulations of said vector pixels.

5. The method as recited in claim 4, wherein said producing said object image comprises:
    transforming said vector pixels, correspondingly and respectively, to scalar pixels; and
    binarizing said scalar pixels to generate a binarized image.

6. The method as recited in claim 5, wherein said producing said object image further comprises segmenting said binarized image into said object image.

7. The method as recited in claim 6, wherein said producing said object image further comprises separating interactively said graphic objects into disjoined graphic objects if more than one of said graphic objects are ambiguously joined together when displayed.

8. The method as recited in claim 7, wherein said generating said patched image comprising:
    selecting a reference color; and
    patching said object spaces in said acquired image with said reference color with respect to said foreground to produce said patched image.

9. The method as recited in claim 8, wherein said generating said patched image further comprising measuring a color difference in said patched image by comparing patched said object spaces with areas, cross-referenced by said background in said object image, in said acquired image.

10. The method as recited in claim 9, wherein said generating said patched image further comprising:
    selecting a new reference color if the comparison in said comparing said patched object spaces with said areas in said acquired image is greater than a threshold; and
    patching said object spaces in the acquired image with said new reference color with respect to said foreground to produce a new patched image.

11. The method as recited in claim 7, wherein said generating said patched image further comprising:
    measuring a color difference in said patched image by comparing said object spaces with areas, cross-referenced by said background in said object image, in said acquired image;
    finding a reference color recursively to minimize said color difference; and
    patching said object spaces in said acquired image with said reference color with respect to said foreground to produce said patched image.

12. The method as recited in claim 11, wherein said generating said patched image further comprising:
    converting one of said object spaces, patched with said reference color, that repeatedly causes said color difference greater than a threshold to a luminance component and two chrominance components thereof;
    applying Fourier Transform to said luminance component and said two chrominance components to produce a spectral luminance and two chrominance components, respectively;
    filtering said spectral luminance and said two chrominance components, respectively, to produce a filtered spectral luminance component and two filtered spectral chrominance components; and
    applying inverse Fourier Transform to said filtered spectral luminance component and said two filtered spectral chrominance components, respectively, to produce a filtered luminance component and two filtered chrominance components.

13. The method as recited in claim 12, wherein said generating said patched image further comprising converting said filtered luminance component and said two chrominance components back to said image.

14. The method as recited in claim 1 further comprising:
    selecting a chosen object from said object image; and
    receiving rendered chosen object generated from said acquired image with respect to said chosen object.

15. The method as recited in claim 14 further comprising superimposing said rendered chosen object onto said patched image to produce a composed output image.

16. The method as recited in claim 1 further comprising:
    selecting interactively a regional image including selected objects from the acquired image;
    generating a regional object image from said regional image;
    generating a regional patched image from said regional image with respect to said regional object image;
    receiving rendered selected objects generated from said regional image with respect to said regional object image; and superimposing said rendered objects onto said regional patched image to produce a composed regional output.

17. The method as recited in claim 16 further comprising superimposing said composed regional output onto the acquired image according to said regional image to produce a composed output.

18. An apparatus for producing a composed output resembling in an image, said apparatus comprising:

a working memory containing said image comprising graphic objects, each of said graphic objects occupying a respective object space;

a display screen;

an object engine generating an object image entirely from said image, said object image containing a foreground and a background, said foreground corresponding to said graphic objects, and said background corresponding to areas unoccupied by said graphic objects, wherein both of said foreground and background are extracted from said image, and said object image is displayable on said display screen so that a user can verify if said foreground in said object image includes correctly all of said graphic objects;

a patch generator generating a patched Image from said object Image by filling in spaces occupied by said foreground; said patched image displayable on said display screen so that the user can determine if said spaces are filled properly;

an object rendering engine producing rendered objects from said graphic objects in said Image with respect to said object image; and a composer superimposing said rendered objects onto said patched image to produce the composed image that has said rendered objects in place of said graphic objects, respectively.

19. The apparatus as recited in claim 18 wherein said object image is in binary format.

20. The apparatus as recited in claim 19 wherein said image comprises vector pixels.

21. The apparatus as recited in claim 20, wherein said object engine comprises:

a color-to-gray converter converting, correspondingly and respectively, said vector pixels to scalar pixels; and a binarizer binarizing said scalar pixels to produce a binarized image.

22. The apparatus as recited in claim 21, wherein said patch generator comprises:

a point-wise patching generator patching each of said object spaces using a color chosen from said image with respect to said background in said object image from said object engine.

23. The apparatus as recited in claim 22, wherein said patch generator further comprises:

a color difference calculator determining a color difference between patched said object spaces and areas in said image cross-referenced by said background.

24. The apparatus as recited in claim 18, wherein said patch generator comprises:

a one-dimensional patching generator producing said patched image by patching object spaces with a reference color adaptively chosen to minimize a color difference between said patched color spaces and areas, cross-referenced by said foreground in said object image, in said image.

25. The apparatus as recited in claim 24, wherein said patch generator further comprises:

a two-dimensional patching generator producing a filtered image from said patched image.

26. The apparatus as recited in claim 25, wherein said two-dimensional patching generator comprises:

a color separator separating said object image into a luminance component and two chrominance components;

a Fourier transformer receiving said luminance component and said two chrominance components and outputting a spectral luminance component and two chrominance components, sequentially and respectively;

a filter filtering said spectral luminance component and said two chrominance components to produce a filtered spectral luminance component and two filtered spectral chrominance components; and a Fourier inverse transformer, coupling to said filter, transforming said filtered spectral luminance component and said two filtered spectral chrominance components to a filtered luminance component and two filtered chrominance components, respectively.

27. The apparatus as recited in claim 26, wherein said two-dimensional patching generator further comprises:

a color transformer, coupling to said Fourier inverse transformer, transforming said filtered luminance component and said two filtered chrominance components to a color image.

28. The apparatus as recited in claim 27, wherein said two-dimensional patching generator further comprises:

an adder adding said color image to said patched image from said one-dimensional patching generator.

* * * * *